Aug. 10, 1943.　　　W. ERNST ET AL　　　2,326,345
TESTING PRESS
Filed Aug. 24, 1940　　5 Sheets-Sheet 1
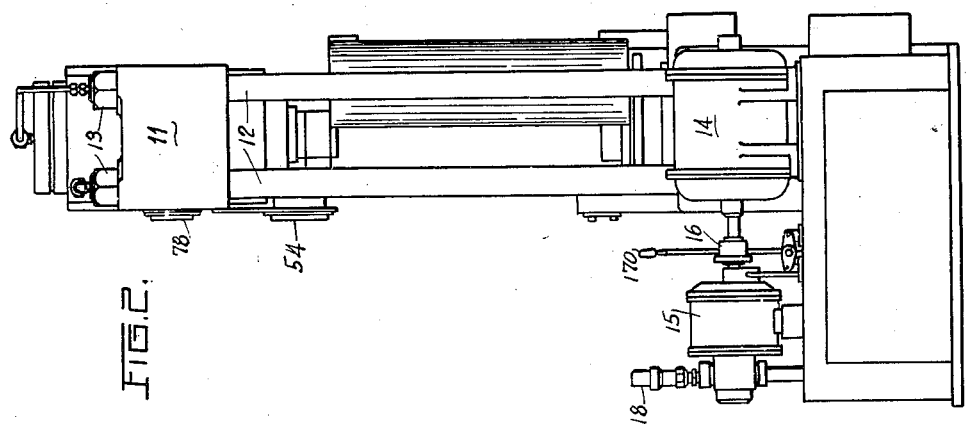
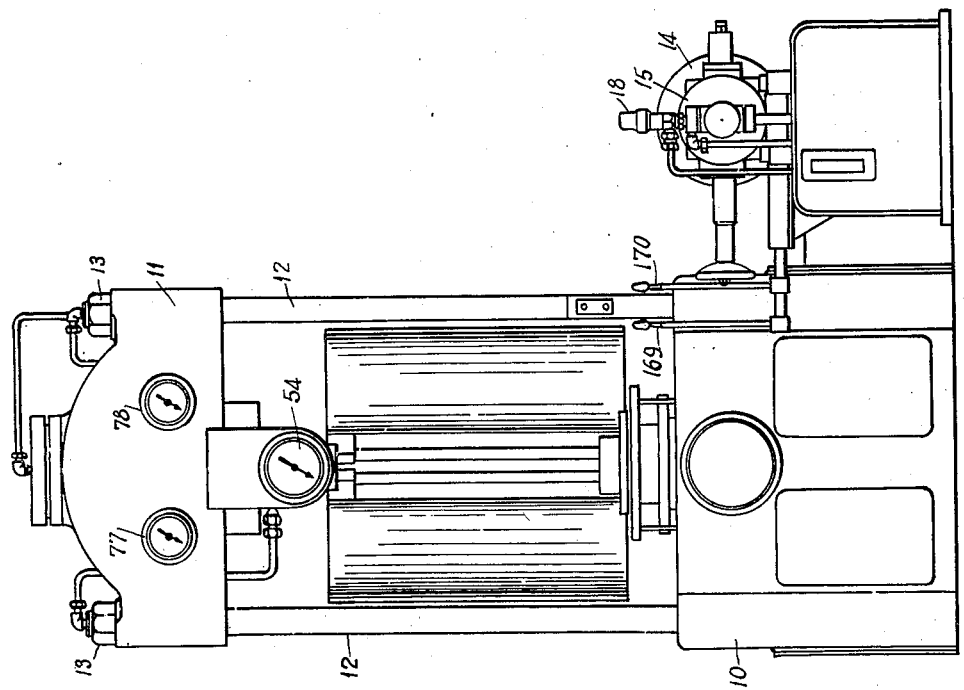
INVENTORS
WALTER ERNST,
IRA B. LAWYER,
BY
Toulmin & Toulmin
ATTORNEYS

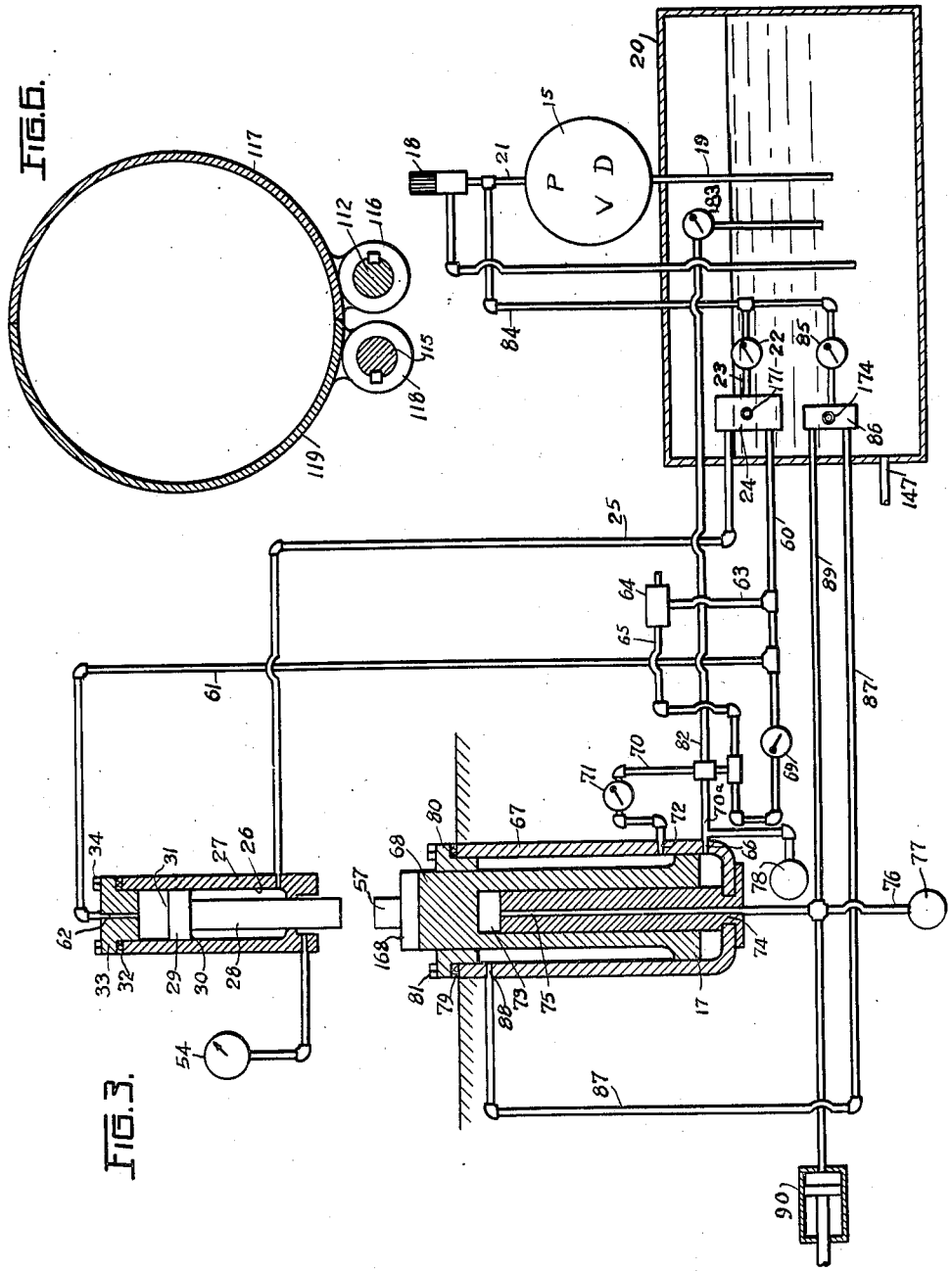

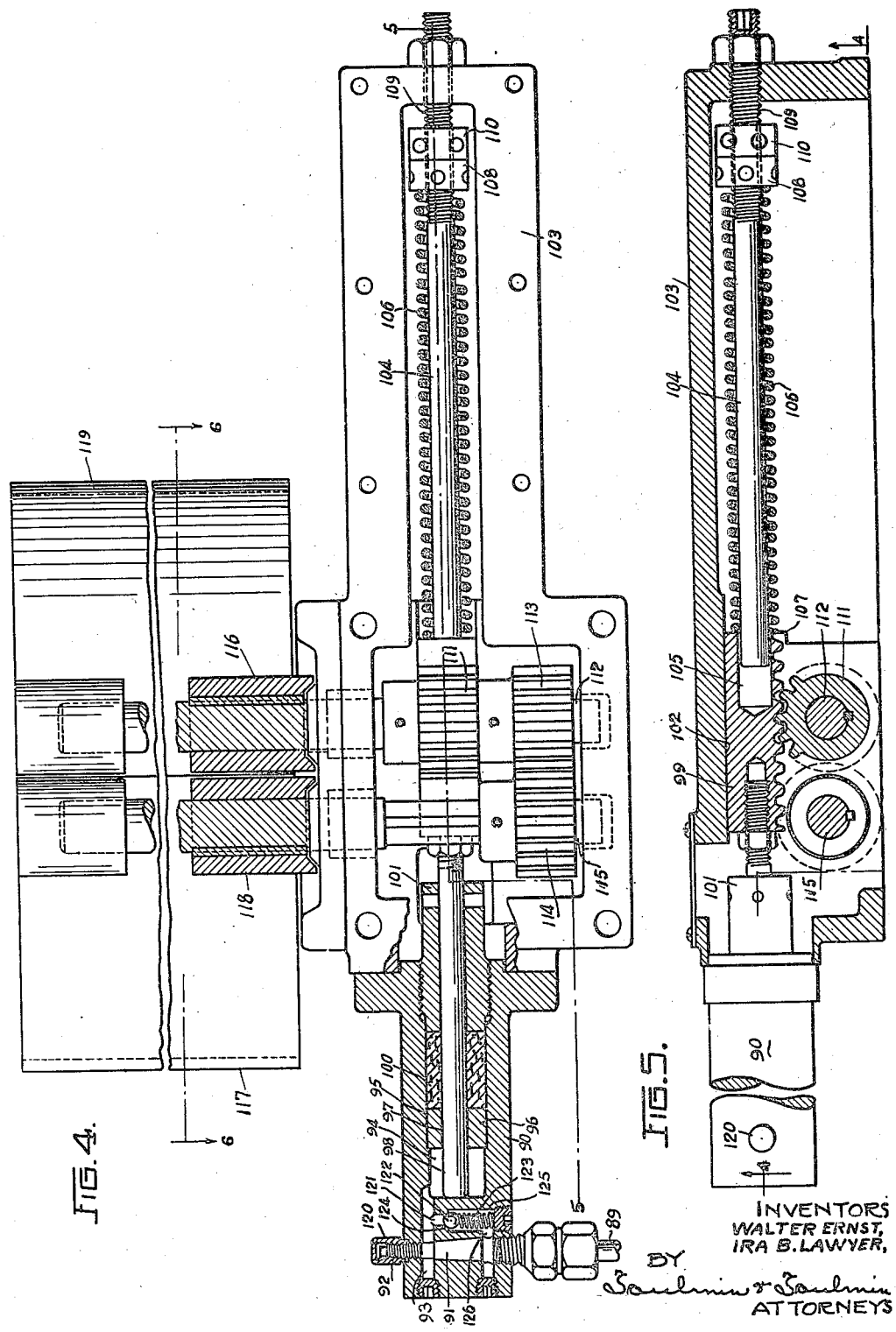

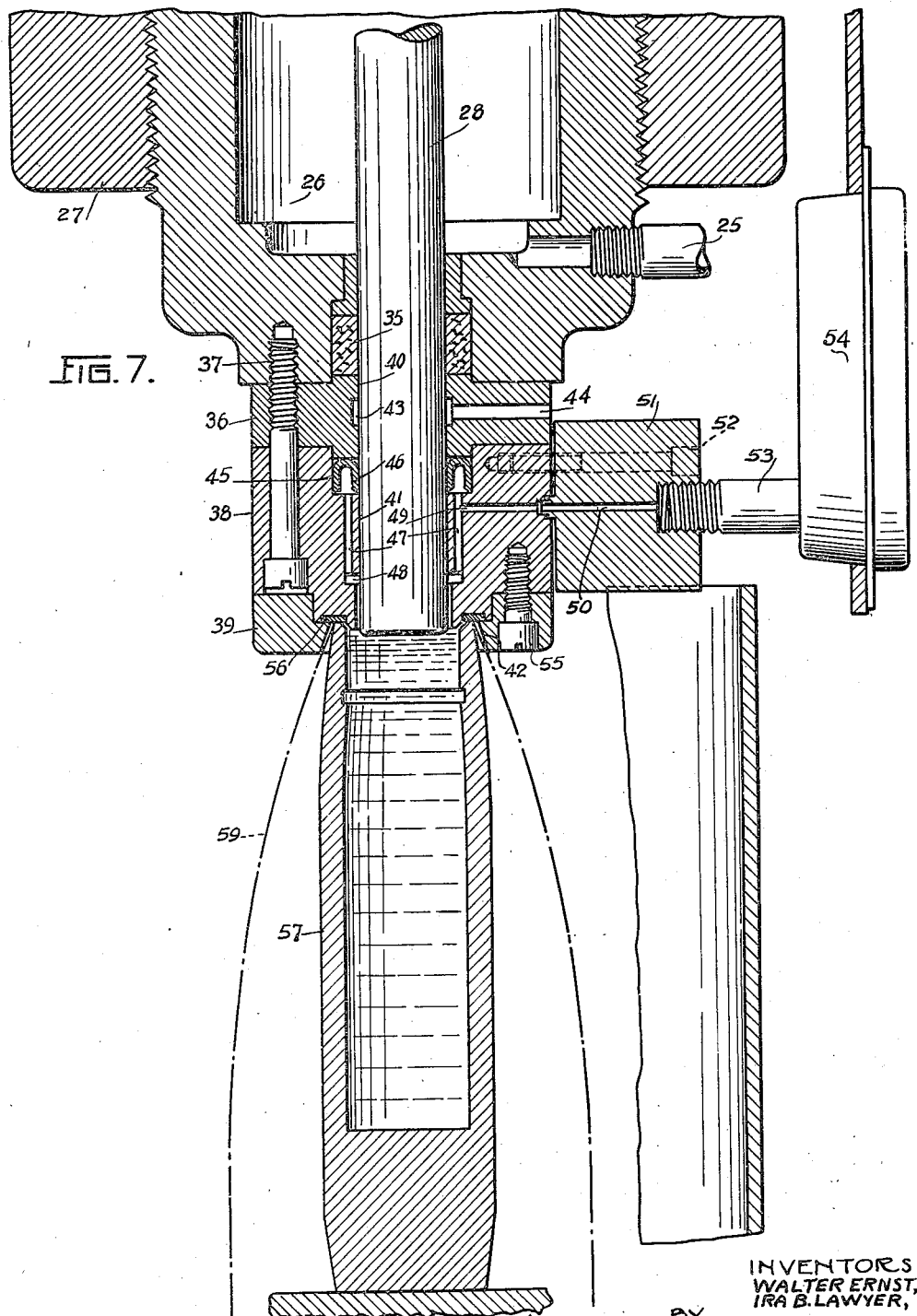

Aug. 10, 1943. W. ERNST ET AL 2,326,345
TESTING PRESS
Filed Aug. 24, 1940 5 Sheets-Sheet 5
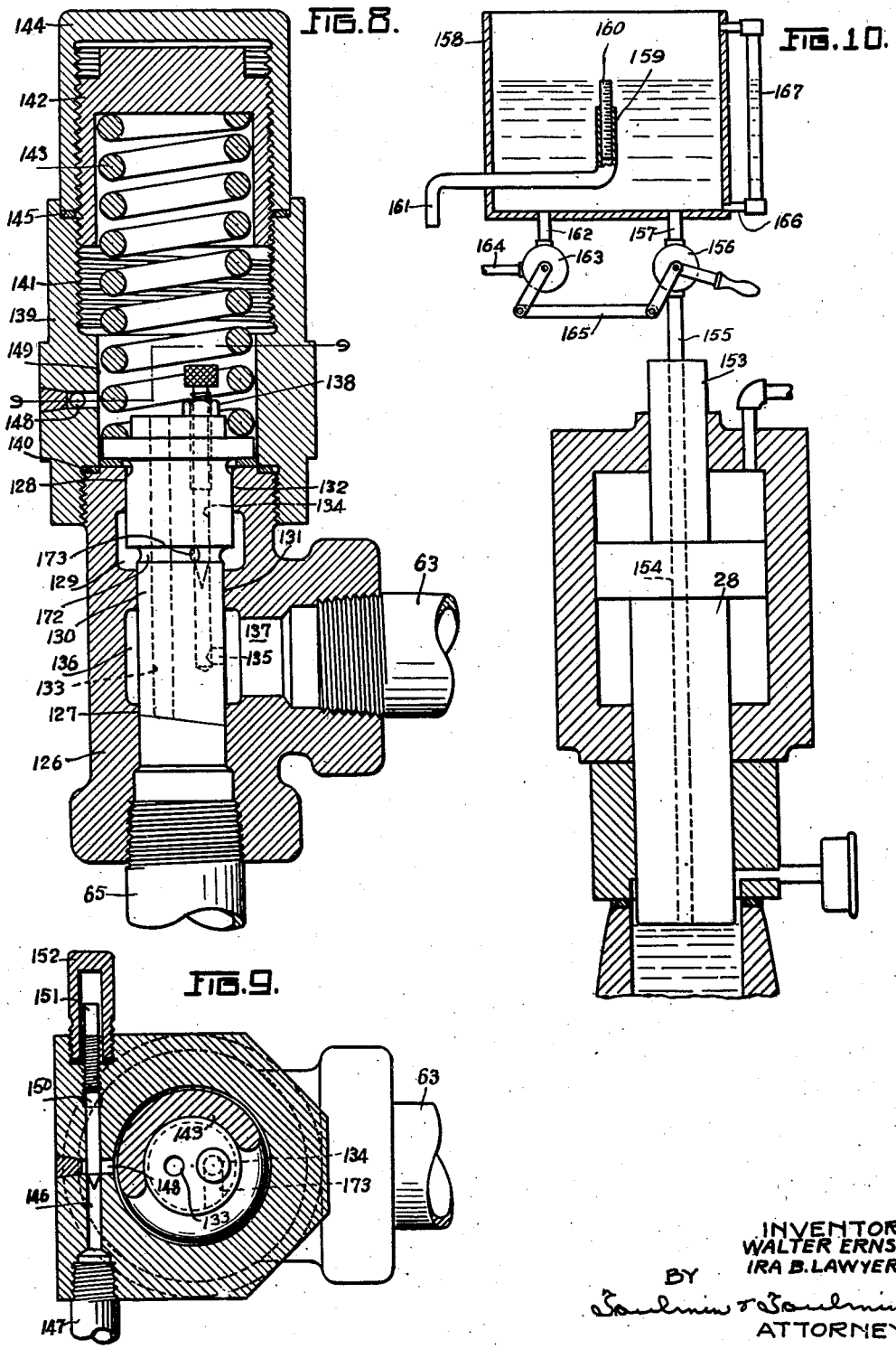
INVENTORS
WALTER ERNST,
IRA B. LAWYER,
BY
Toulmin & Toulmin
ATTORNEYS Patented Aug. 10, 1943

2,326,345

UNITED STATES PATENT OFFICE 2,326,345

TESTING PRESS

Walter Ernst and Ira B. Lawyer, Mount Gilead, Ohio, assignors to The Hydraulic Development Corporation, Inc., Wilmington, Del., a corporation of Delaware Application August 24, 1940, Serial No. 354,096

14 Claims. (Cl. 73—51)

This invention relates to presses, and in particular to hydraulic presses for testing articles which are to be subjected to or have to work under high pressures, as for instance shells, valve bodies, fittings, cylinders, etc.

It is an object of the invention to provide a testing press for testing hollow articles in which the article to be tested is subjected to hydrostatic pressure.

Another object of the invention consists in the provision of a hydraulic testing press for testing hollow articles in which hydraulically controlled pressure is exerted on fluid filling a recess, bore, or the like, of the article to be tested.

It is a further object of the invention to provide a testing press, as set forth above, which comprises a plurality of cylinder-piston-assemblies operable in a predetermined sequence for receiving the work piece to be tested therebetween and effecting the testing operation.

Still another object of the invention consists in the provision of a hydraulic testing press for testing hollow articles, in which the work piece is adapted to be covered by protective means so as to prevent injuries to the operator in case the work piece should break.

It is also an object of the invention to provide a testing press, as set forth in the preceding paragraph, in which the work piece is hydraulically moved into its testing position while simultaneously movement of the protective means to its operative position is initiated.

Another object of the invention consists in the provision of a testing press for testing hollow articles in which protective means for covering the work piece to be tested is provided and is movable into its operative position at a selective rate.

A still further object of the invention consists in providing a hydraulic testing press for hollow articles in which the clamping pressure for holding the work piece in its testing position is variable.

Still another object of the invention consists in the provision of a testing press for hollow articles which comprises a hydraulic system for filling the work piece to be tested with fluid after the work piece has been placed on the testing press.

It is another object of the invention to provide a press, as set forth in the preceding paragraph, which includes adjustable automatic measuring means for meting out a predetermined quantity of fluid for filling the article to be tested.

These and other objects and advantages of the invention will appear more clearly from the following specification in connection with the accompanying drawings, in which:

Figure 1 is a front view of an embodiment of a testing press according to the invention.

Figure 2 is a side view of the press shown in Figure 1.

Figure 3 shows diagrammatically the general arrangement of the piping and control system.

Figure 4 is a section along the line 4—4 of Figure 5 showing a structural detail of the press for operating the shields protecting the operator against injuries.

Figure 5 is a section along the line 5—5 of Figure 4.

Figure 6 is a section along the line 6—6 of Figure 4, however, with the protecting shields in closed position.

Figure 7 illustrates the testing plunger proper or intensifier.

Figure 8 is a reducing valve preferably used with the press according to the invention.

Figure 9 is a section along the line 9—9 of Figure 8, and

Figure 10 shows a second embodiment which comprises means for filling the work piece to be tested with fluid after it has been placed on the testing machine.

General arrangement

The testing press according to the present invention comprises in general two cooperating hydraulically operable cylinder-piston-assemblies, one of which clamps the article to be tested into its testing position, while the other cylinder-piston-assembly actuates the actual testing pressure upon fluid filling a hollow space in the article to be tested. The clamping cylinder-piston-assembly is associated with a mechanism which, when the clamping operation is initiated, actuates shields adapted to cover up the work piece to be tested so as to protect the operator against possible injuries in case the work piece should break. The mechanism for actuating the protective shields is adjustable so as to vary the speed or rate at which the operation of the said shields is effected. The invention furthermore comprises means for varying the clamping pressure after the work piece has been properly located and the operation of the intensifier has been initiated.

According to a further development of the invention, the press is provided with an adjustable measuring device which automatically metes out a predetermined quantity of fluid for filling the article to be tested

Structural arrangement

Referring now to the drawings in detail, the press, according to the invention, comprises a press bed 10 and a press head 11 interconnected with each other by strain rods 12 and nuts 13. Mounted on the press bed is an electromotor 14 for driving a variable delivery pump 15. The motor 14 and pump 15 are drivingly connected by means of a coupling 16. The variable delivery pump 15 which is provided with a safety valve 18 has its suction side connected by means of a conduit 19 with a fluid or surge tank 20. The pressure side of the pump 15 is connected by means of a conduit 21, leading to the safety valve 18 with a check valve 22 which, in its turn, is connected by conduit 23 with a four-way valve 24, of any convenient structure. A conduit 25 leads from the four-way valve 24 to the lower portion of the bore 26 of the intensifier cylinder 27. The cylinder 27 is stationary and preferably supported by the cylinder head 11. Reciprocably mounted in the cylinder 27 is the intensifier or testing plunger 28 carrying a piston head 29 with a smaller lower surface 30 and a larger upper surface 31. The upper end of the intensifier cylinder 27 is closed by a gasket 32 and a cylinder head 33 pressing said gasket against a portion of the cylinder 27 by means of screws 34. As will be seen from Figure 7, the lower portion of the cylinder 27 is likewise protected against leakage by means of a packing 35 compressed by a gland 36 which, by means of screws 37, is connected to the cylinder 27 together with a collar 38, while a ring member 39 is connected to the collar 38 by screws 55. The gland 36, collar 38 and ring member 39 are provided with bores 40, 41 and 42 respectively, through which the plunger 28 may pass. The bore 40 of the gland 36 has an annular recess 43 connected with a bore 44 passing to the outside. The collar 38 has a recess 45 adjacent its bore 41 for receiving a seal 46. The lower portion of the recess 45 communicates through bores 47 with an annular recess 48 connected with the bore 41 of the collar 38. The bores 47 communicate through a passageway 49 with a bore 50 in the fitting 51 connected with the collar 38 by means of screws 52. The conduit 50 communicates with a pipe 53 leading to a gauge 54 for indicating the pressure exerted by the intensifier plunger 28.

Arranged between the collar 38 and the ring member 39 is a gasket 56 against the lower portion of which the work piece 57 may be clamped. As will be seen from Figure 7, the bore 42 in the ring member 39 is tapered so that work pieces of various sizes can be clamped against the gasket 56. To illustrate this, Figure 7 shows, in dot-dash lines, a shell 59 of greater dimensions than the shell or the work piece 57.

The four-way valve 24 is furthermore connected by means of a conduit 60 and conduit 61, branching off from conduit 60, with a bore 62 in the cylinder head which bore leads to the upper portion of the cylinder 27. Branching off from the conduit 60 is a conduit 63 leading to a reducing valve 64 which, by means of a conduit 65, is adapted to communicate with a port 66 in the lower portion of the clamping cylinder 67 mounted on the press bed 10. The reducing valve 64, which is more clearly shown in Figure 8, is adapted to maintain the clamping pressure exerted by the clamping piston 68 reciprocable in the clamping cylinder 67 at a predetermined ratio with regard to the pressure applied to the intensifier plunger 28. The conduit 60 comprises a check valve 69 and communicates with a conduit 70 comprising a check valve 71 and leading to the bore 72 in the pressing cylinder 67. The purpose of the check valve 69 consists in forcing the fluid coming from the four-way valve 24 to pass through the reducing valve 64. The check valve 71 prevents the flow of fluid from conduit 70 to the retraction side of the clamping plunger 68, while permitting the flow of fluid in the reverse direction as soon as the piston portion 17, in its downward movement or retraction stroke, has passed the bore 72. The clamping plunger 68 has a cylinder bore 73 in which telescopes a stationary booster 74. The booster 74 has a bore 75 passing through its entire length and communicating with a conduit 76 leading to a gauge 77 (Figure 1) for indicating the booster pressure. The conduit 70 is connected with a conduit 70a which in its turn communicates with another gauge 78 for indicating the additional clamping pressure exerted by fluid acting upon the lower portion of the clamping plunger 68. The upper portion of the clamping cylinder 67 is closed by a gasket 79 pressed by a cylinder head 80 and bolts 81 against the cylinder 67.

Branching off from the conduit 70 is a conduit 82 leading to a check valve 83 adapted to communicate with the interior of the surge tank 20.

Branching off from the conduit 21 and communicating with the pressure side of the variable delivery pump 15 is a conduit 84 comprising a check valve 85 and leading to a four-way valve 86. The four-way valve 86 is adapted to communicate through a conduit 87 with a bore 88 at the upper portion of the clamping cylinder 67. A further conduit 89 communicates on one hand with the four-way valve 86 and on the other hand with a shield operating cylinder 90 through an adjustable choke 91 (Figure 4). The choke 91 is adjustable by a screw 92 so as to vary the section through which the fluid passing through conduit 89 may enter the bore 93 leading to the bore 94 of the shield operating cylinder 90. The screw 92 is secured in its position by a cap 120 which at the same time protects the screw from undue manipulation. Communicating with the bore 93 provided in the cylinder 90 is a passageway 121 which is controlled by a ball 122 continuously urged by a spring 123 against the valve seat 124. The spring 123 is arranged in a bore 125 communicating through passageway 126 with the conduit 89. The bore 94 of the cylinder 90 comprises a step 95 having mounted therein a guiding member 96 with a bore 97 through which passes the plunger 98. The plunger 98 which is connected with a rack 99 passes through a packing 100 pressed against the guiding member 96 by a guiding member 101. The rack 99 is slidable on the surface 102 of the arm 103 supporting the cylinder 90. The arm 103 carries a guiding shaft 104 telescoped in the bore 105 of the rack 99. Mounted on the guiding shaft 104 is a spring 106 which engages on one hand the end surface 107 of the rack 99 and on the other hand an adjusting nut 108 threadedly mounted on a corresponding thread 109 of the shaft 104. The nut 108 is secured in its position by a second nut 110. By adjusting the nut 108 the thrust of the spring 106 may be varied, thereby determining the pressure which, when acting upon the plunger 98, will cause movement of the rack 99. The rack 99 meshes with a gear 111 keyed to a shaft 112 which is keyed to a gear 113 meshing with a gear 114 keyed to a shaft 115. The shaft 112 has furthermore keyed thereto a lug 116 carrying a semi-circular shield 117. Similarly, the shaft 115 has keyed thereto a lug 118 carrying a semi-circular shield 119 so that rotation of the shafts 112 and 115 is adapted to swing the shields 117 and 119 toward each other for enclosing the work piece, or to swing the shields away from each other to enable removal of the work piece.

Referring now to Figures 8 and 9, showing the reducing valve 64 in detail, the reducing valve comprises a cylinder portion 126 with a cylinder bore 127 and a cylinder bore 128, separated from each other by a recess 129. Reciprocably mounted in the cylinder bores 127 and 128 is a stepped piston 130 with piston portions 131 and 132, separated from each other by an annular groove 172. The piston 130 has a bore 133 passing through the entire length of the piston, whereas another bore 134 passes from the upper portion of the piston 130 to a bore 135 leading to a recess 136 communicating through a bore 137 with the conduit 63. The bore 134 communicates through a transverse bore 173 with the groove 172, while a valve member 138 threadedly mounted in the bore 134 determines the section through which fluid entering the bore 135 may pass into the groove 172 and from there into the recess 129. The cylinder bore 127 communicates with the conduit 65. Threadedly connected to the cylinder portion 126 is a tubular member 139 pressing a gasket 140 against the cylinder portion 126 so as to avoid leakage between the tubular member 139 and the cylinder portion 126. The tubular member 139 has a threaded bore 141 which is engaged by a hollow plug 142 abutting one end of a spring 143, while the other end of the spring 143 abuts the upper portion of the piston 139. To prevent undue manipulation of the nut 142 a cap 144 is threaded upon the plug 142 so as to cover the latter while simultaneously pressing a gasket 145 between the lower end of the cap 144 and the upper end of the tubular member 139. As will be seen from Figure 9, the tubular member 139 has a transverse bore 146 communicating through a conduit 147 with the surge tank 20, while communicating through the passageway 148 with the bore 149 of the tubular member 139. The bore 146 has adjustably mounted therein a choke member 150 for varying the passage through which the fluid from the passageway 148 has to pass into the conduit 147. To protect undue manipulation of the choke member 150 the head 151 thereof is protected by a cap 152 threaded into the tubular member 139.

While a work piece, when tested on a machine described so far, has to be filled with fluid before it is placed on the machine, the embodiment illustrated in Figure 10 shows a hydraulic circuit which allows filling the work piece with fluid after it has been placed on the press bed. According to this embodiment, the intensifier plunger 28 has an extension 153 passing through the cylinder head 33. The bore 154 passes from the upper end of the extension 153 to the lower end of the intensifier plunger 28 and is connected with a pipe 155 leading to a two-way valve 156. The pipe 155 may be telescoped in the bore 154 or, if desired, may be made flexible. The valve 156 is adapted, when opened, to communicate with a conduit 157 leading to a measuring container 158. The measuring container 158 has mounted therein an overflow pipe 159 with an adjustable pipe 160 telescoped therein. The pipe 160 has a scale thereon so as to indicate its position relative to the overflow pipe 159 which is connected through a conduit 161 either to the surge tank 20 or to another exhaust. The container 158 furthermore communicates with a conduit 162 comprising a two-way valve 163 which, when opened, communicates through the conduit 164 either with the pump 15 or with an independent source of fluid adapted to supply fluid to the container 158. The valves 163 and 156 are interconnected by means of a linkage 165 in such a manner that operation of the linkage 165 will close one valve while opening the other valve and vice versa. Therefore, if for instance the valve 156 is closed, fluid will pass through the valve 163 into the container 158 and fill the latter up to the level determined by the extent to which the pipe 160 protrudes beyond the pipe 159. It will be evident that the pipe 160 is so adjusted that the quantity of fluid admitted to the container 158 corresponds to the quantity of fluid necessary for filling the work piece to be tested. When fluid has filled the container 158 to the predetermined level, further fluid will flow to the surge tank or to exhaust through the conduit 161. Preferably the container 158 communicates through a conduit 166 with a gauge 167 indicating the fluid level in the container 158. The operator may, at a desired time, open the valve 156 and close the valve 163 so that fluid accumulated in the container 158 will then be unloaded through the conduit 155 into the bore 154 from where the fluid will flow into the recess of the work piece to be tested whereupon the valve 156 is again closed and the valve 163 is again opened so that the container will again fill with fluid. Otherwise Figure 10 corresponds in its construction to the press described in connection with Figures 1 to 9.

*Operation*

In order to carry out a testing operation and providing that all parts of the machine occupy the position shown in Figure 3, the operator starts the motor 14 and, thereby, also the pump 15. Pressure will now develop in the conduit 64. As long as the four-way valves 24 and 86 are closed, the pressure cannot pass beyond the said two valves.

Assuming now that the work piece 57 has been filled with fluid and placed on a receiving member 168 connected with the clamping plunger 68, the operator shifts the lever 169 (Figure 1) so as to open the four-way valve 86 and to allow pressure fluid to pass from the conduit 84 through the four-way valve 86 and the conduits 89 and 76 through the bore 75 into the booster cylinder 73. The pressure in the booster cylinder 73 then causes the clamping plunger 68 to move upwardly from its lowermost position shown in Figure 3, thereby lifting the work piece 57 so that its open end is pressed against the gasket 56 between the collar 38 and the ring member 39. The suction created in the lower portion of cylinder 67 during this upward movement of plunger 68 causes fluid to flow from the tank 20 through conduits 92 and 70a into the cylinder 67, thereby filling the space beneath the piston portion 17. While pressure is applied to the clamping plunger 68, pressure fluid also passes through the conduit 89 into the shield operating cylinder 99 where it acts upon the plunger 98. Movement of the plunger 98 causes movement of the rack 99 which rotates the gear 111 and thereby also the gears 113 and 114. Rotation of the gears 111 and 114 causes the shields 117 and 119 to swing toward each other thereby enclosing the work piece. According to the adjustment of the choke 91 and the passageway made available thereby to the fluid passing through the conduit 89, the closing operation of the shields 117 and 119 will be effected with a desired speed.

When the work piece is securely clamped between the gasket 55 and the receiving member 168, the operator manipulates his hand lever 170 (Figure 1) to open the valve 24 for admitting pressure fluid from the conduit 84 into the conduit 60 from where it flows through the conduit 61 and the bore 62 into the upper portion of the intensifier cylinder 27 where it acts upon the intensifier piston head 29. It will be noted that no fluid can pass from conduit 60 through check valve 69 into conduit 70a. As soon as pressure begins to build up in cylinder 27, this pressure is conveyed through conduit 63 and bores 134 and 173 beneath the piston 132 of valve 64, so as to lift the piston 132 and to establish fluid connection between the conduits 63 and 65. Pressure fluid then passes from the conduit 60 through conduit 63, reducing valve 64, conduits 65 and 70a and through the bore 66 into the lower portion of the clamping cylinder 67 so that pressure is applied simultaneously to the intensifier plunger 28 and the clamping plunger 68.

The reason to apply full clamping pressure to the clamping plunger 68 only simultaneously with applying pressure to the intensifier plunger 28 and not simultaneously with the admission of clamping pressure to the booster cylinder 73 consists in that in the latter instance the sealing gasket 55 might be crushed or cut. However, by simultaneously applying pressure to the clamping cylinder 68 and the intensifier plunger 28, the clamping pressure exerted by the clamping piston 69 is partly balanced by the pressure exerted by the intensifier plunger 28.

The intensifier plunger 28 now enters the fluid filled recess in the work piece and squeezes a portion of the fluid through the recess 43 and bores 47, 49, 50 and 53 into the gauge 54 thereby informing the operator of the pressure exerted by the intensifier plunger 28 so that the operator may finish his testing operation at the attainment of a predetermined pressure. When the testing pressure has reached the desired amount, the operator shifts the valve 24 to the position where fluid pressure will be admitted through the conduit 25 into the lower portion of the intensifier cylinder 27 so that the pressure developed below the piston head 31 will lift the intensifier plunger, thereby relieving the pressure in the work piece. The fluid displaced by the upward movement of the intensifier plunger 28 passes through the conduit 60 and the opening 171 of the four-way valve 24 into the surge tank 20.

When the intensifier pressure has been reduced, the operator shifts the valve 86 so as to allow pressure fluid to pass from the conduit 84 into the conduit 87 from where it flows into the upper portion of the clamping cylinder 67 thereby causing retraction of the clamping plunger 68. The displaced fluid in the lower portion of the clamping cylinder; i. e., beneath the piston 17, escapes through both the bore 66 and the check valve 71 into the conduit 60 from where it passes through the opening 171 of the four-way valve 24 into the fluid tank 20. At the same time the pressure fluid which was applied to the shield actuating cylinder 90 through the conduit 89 is relieved, thereby allowing the spring 106 to move the rack 99 and the plunger 98 to their initial position so that the gears 111 and 114 are now rotated in a reverse direction with the result that the shields 117 and 119 are opened. The work piece may now be removed. The fluid expelled by the plunger 98 during its return stroke passes through the conduit 89 and the opening 174 of the four-way valve 86 into the fluid tank 20.

The escape of pressure fluid from the shield operating cylinder 90 is facilitated by the provision of the spring loaded check valve 122, 123, which by-passes the choke 91.

As previously mentioned, the reducing valve 64 serves for maintaining the clamping pressure during the testing operation at a predetermined ratio with regard to the pressure applied to the intensifier, in other words, when the pressure acting on the piston 17 increases, also the pressure on the piston area 31 of the intensifier plunger 28 increases.

As will be seen from Figure 8, fluid passing through the conduit 63 enters the bore 135 and then passes around the lower end of the choke member 134 through the bore 173 into the groove 172 from where it flows into the recess 129. Here the pressure fluid acts upon the piston portion 132 and lifts the latter against the action of the spring 143 so that fluid may pass from the conduit 63 through the bore 137 directly to the conduit 65. The pressure in the conduit 65 is conveyed through the bore 133 to the upper portion of the stepped piston 130 where it supports the action of the spring 143. After some time the stepped piston 130 occupies a balanced position in which a predetermined quantity of pressure fluid passes directly from the conduit 63 into the conduit 65. As will be evident from Figure 9, a small quantity of fluid continuously passes from the bore 141 through the passageway 148 and the bore 146 to the conduit 147 leading to the fluid tank 20. This fluid is continuously replaced by fluid passing through the conduit 63. When the piston 17, during its downward or retracting stroke, has again reached the position shown in Figure 3, check valve 71 establishes fluid connection between the bore 72 and conduit 70, so that the delivery of the pump 15 through conduit 87 into the upper portion of cylinder 67 is discharged through bore 72, check valve 71, conduits 70, 60 and opening 171 into the tank 20. Piston 17, therefore, comes to a halt. All parts now again occupy the position shown in Figure 3.

It will be understood that we desire to comprehend within our invention such modifications as come within the scope of the claims and the invention.

Having thus fully described our invention, what we claim as new and desire to secure by Letters Patent, is:

1. In a press, fluid operable means for hydraulically supporting a work piece and clamping it against an abutment, means for admitting pressure fluid to a restricted area of said fluid operable means to cause the latter to exert a restricted clamping pressure upon said work piece, fluid operable pressing means adapted to enter a recess in said work piece for exerting pressure upon fluid filling said recess in the work piece, and means responsive to a predetermined pressure acting on said pressing means for admitting pressure fluid to an increased area of said fluid operable means for causing the latter to exert full clamping pressure on said work piece.

2. In a press, fluid operable means for lifting a work piece and clamping it against an abutment, means for admitting pressure fluid to a restricted area of said fluid operable means to cause the latter to exert a restricted clamping pressure upon said work piece, fluid operable pressing means adapted to enter a recess in said work piece for exerting pressure upon fluid filling said recess in said work piece, first conduit means for admitting pressure fluid to said restricted area, second conduit means for admitting pressure fluid to said pressing means independently of the supply of pressure fluid to said restricted area, third conduit means for admitting pressure fluid to an increased area of said fluid operable clamping means, and fluid pressure responsive means responsive to a predetermined pressure acting on said pressing means for hydraulically interconnecting said second and third conduit means to maintain a predetermined ratio between the pressure acting on said pressing means and the pressure acting on said fluid operable clamping means while said work piece is clamped.

3. In a press, hydraulically operable means adapted to movably support a work piece and to clamp it against an abutment, said means comprising a plunger with a booster area and a main area, hydraulically operable pressing means adapted to enter a liquid filled recess in said work piece for exerting pressure upon said liquid, valve means operable selectively to supply pressure fluid to said booster area and said pressing means, and controlling means operable in response to a predetermined pressure acting on said pressing means for automatically admitting pressure fluid to said main area.

4. In a testing press, a press bed supporting a stationary clamping cylinder, a fluid operable clamping plunger reciprocably mounted in said clamping cylinder and having a booster area and a main area, a press head, a testing cylinder supported by said press head, a fluid operable testing plunger reciprocable in said testing cylinder, a fluid source adapted to supply fluid to said clamping cylinder and to said testing cylinder for actuating the plungers pertaining thereto, first controlling means for admitting fluid from said fluid source to said booster area, second controlling means operable independently of said first controlling means for conveying pressure fluid from said fluid source to said testing plunger to move the latter toward said clamping plunger, and pressure responsive means hydraulically connected with said testing plunger and adapted in response to a predetermined pressure on said testing plunger to convey pressure fluid to said main area.

5. In a testing press, a first and a second hydraulically operable cylinder-piston-assembly arranged in alignment with each other and adapted to act in a direction opposite with respect to each other, a fluid source adapted to supply pressure fluid to said cylinder-piston-assemblies, said first cylinder-piston-assembly having a plunger with a main area and a booster area and being adapted to clamp a work piece against the cylinder of said second cylinder-piston-assembly, and the piston of said second cylinder-piston-assembly being adapted to enter a recess in said work piece, first controlling means for controlling the flow of fluid from said fluid source to said booster area, second controlling means independent of said first controlling means for controlling the flow of fluid from said fluid source to said second cylinder-piston-assembly, and means responsive to a predetermined pressure in said second cylinder-piston-assembly for automatically admitting pressure fluid to said main area.

6. In a testing press, a hydraulically operable clamping plunger, work piece receiving means connected to said plunger, a hydraulically operable testing plunger adapted to be actuated independently of said clamping plunger and to enter a recess in a work piece placed upon said work piece receiving means, a fluid source adapted to supply pressure fluid to said plungers, and control means, hydraulically connected with said testing plunger, for permitting of only a limited fluid pressure being exerted upon said clamping plunger prior to a predetermined fluid pressure being exerted upon said testing plunger, said control means being responsive to the exertion of said predetermined fluid pressure upon said testing plunger for conveying increased fluid pressure to said clamping plunger and maintaining a predetermined ratio between the pressure acting on said testing plunger and the pressure acting on said clamping plunger during the actual testing operation of said testing plunger.

7. In a testing press, a press bed, a clamping cylinder supported by said press bed, a double-acting clamping plunger reciprocably mounted in said clamping cylinder and comprising a main area and a booster cylinder, a booster plunger rigidly connected with said clamping cylinder and telescoped in said booster cylinder, said clamping plunger being adapted movably to support a work piece and to clamp the latter against an abutment, a testing plunger arranged in alignment with said clamping cylinder and adapted to enter a recess in said work piece, a fluid source for supplying pressure fluid, and pressure responsive controlling means for automatically preventing the supply of pressure fluid to the main area of said clamping plunger prior to the application of a predetermined pressure to said testing plunger.

8. In a testing press, hydraulically operable supporting means adapted movably to support a hollow work piece and to hold the latter in testing position, hydraulically operable pressing means adapted to enter said hollow work piece for exerting pressure upon fluid filling said work piece, shielding means comprising two semi-circular shields movable toward each other for shielding the work piece, each of said shields being rotatably connected with a pinion of a gear train including a rack, hydraulically operable actuating means for reciprocating said rack, a fluid source adapted to supply pressure fluid to each of said means, and control means for concomitantly admitting fluid from said fluid source to said supporting means and said actuating means.

9. In a testing press, a press bed, a clamping cylinder-piston-assembly associated with said press bed and adapted movably to support a hollow work piece and to hold the latter in testing position, a press head supporting a testing cylinder-piston-assembly arranged in alignment with said clamping cylinder-piston-assembly for exerting pressure on fluid filling said hollow work piece, swingable shielding plates adapted to be moved relative to each other so as to shield the work piece, a gear operatively connected with said shielding plates, a hydraulically operable rack meshing with said gear and adapted to rotate the latter for selectively closing and opening said shielding plates, and hydraulic means for actuating said rack, said clamping cylinder-piston-assembly and said testing cylinder-piston-assembly.

10. In a testing press, a clamping cylinder-piston-assembly adapted to movably support a hollow work piece and to hold the same in testing position, a pressing cylinder-piston-assembly arranged in alignment with said clamping cylinder-piston-assembly for actuating pressure on fluid in said hollow work piece, shielding means operable selectively to shield said work piece and uncover the same, a shielding means actuating cylinder-piston-assembly, a fluid source for supplying pressure fluid, controlling means for controlling the supply of pressure fluid from said fluid source to said clamping cylinder-piston-assembly, said pressing cylinder-piston-assembly and said shielding means actuating cylinder-piston-assembly in a predetermined sequence, choke means associated with said shielding means actuating cylinder-piston-assembly for determining the rate of operation of said shielding means, and check valve means likewise associated with said shielding means actuating cylinder-piston-assembly for allowing a quick discharge of fluid from said shielding means actuating cylinder-piston-assembly when opening said shielding means.

11. In a testing press, hydraulically operable clamping means for movably supporting and holding a hollow work piece in testing position, hydraulically operable pressing means for exerting pressure on fluid in said hollow work piece, a fluid source, a hydraulic circuit interconnecting said fluid source and said clamping and pressing means for supplying pressure fluid to said clamping and pressing means, and adjustable pressure responsive means for automatically establishing and maintaining a predetermined ratio between the clamping pressure of said clamping means and the pressure applied by said pressing means during the testing operation.

12. In a testing press, hydraulically operable supporting means adapted to movably support a hollow work piece and clamp the same in testing position, hydraulically operable pressing means for exerting pressure on fluid in said hollow work piece, pressure indicating means operably connected with said pressing means for indicating the pressure exerted by said pressing means, a fluid source adapted to supply pressure fluid to said clamping means and said pressing means, and pressure responsive controlling means for automatically establishing and maintaining a predetermined ratio between the clamping pressure applied by said supporting means and the pressure applied by said pressing means during a testing operation.

13. In a testing press, hydraulically operable clamping means adapted movably to support a hollow work piece and to hold the same in testing position, a hydraulically operable testing plunger adapted to enter said hollow work piece to exert pressure on fluid in said work piece, said testing plunger having a passageway therethrough for admitting fluid into said work piece, a high pressure fluid source for supplying pressure fluid to said clamping means and said testing plunger, a low pressure fluid source for supplying fluid through said passageway into said work piece, controlling means interposed between said low pressure fluid source and said passageway for admitting a predetermined quantity of fluid from said low pressure fluid source through said passageway into said work piece, and means associated with said controlling means for selectively interrupting fluid connection between said work piece and said low pressure fluid source through said passageway.

14. In a testing press, clamping means for hydraulically supporting a hollow work piece and holding the same in testing position, liquid storage means for storing liquid to be unloaded into said work piece for the testing of the same, means for filling said storage means with a predetermined quantity of liquid, adjustable means for maintaining the liquid in said storage means at a predetermined level in accordance with said predetermined quantity to be unloaded in said work piece, a fluid operable testing plunger having a longitudinal bore therethrough and being adapted to enter said hollow work piece to exert pressure on liquid in said work piece, means hydraulically connected with said bore in said plunger for conveying said predetermined quantity of liquid from said storage means into said hollow work piece prior to the actual pressing operation of said testing plunger, means for interrupting fluid connection between said storage means and said hollow work piece during the pressing operation of said testing plunger, and means for supplying pressure fluid to said testing plunger to cause the latter to exert a pressing or testing operation.

WALTER ERNST.
IRA B. LAWYER.